(12) United States Patent
Goss et al.

(10) Patent No.: US 8,417,878 B2
(45) Date of Patent: Apr. 9, 2013

(54) SELECTION OF UNITS FOR GARBAGE COLLECTION IN FLASH MEMORY

(75) Inventors: Ryan James Goss, Lakeville, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 397 days.

(21) Appl. No.: 12/886,196

(22) Filed: Sep. 20, 2010

(65) Prior Publication Data

US 2012/0072639 A1    Mar. 22, 2012

(51) Int. Cl.
*G06F 12/00*        (2006.01)

(52) U.S. Cl.
USPC .......................... 711/103; 707/813

(58) Field of Classification Search ................ 711/103; 707/813
See application file for complete search history.

(56) References Cited

U.S. PATENT DOCUMENTS

| 2008/0109590 A1 | 5/2008 | Jung et al. |
| 2009/0327591 A1 | 12/2009 | Moshayedi |
| 2010/0106753 A1 | 4/2010 | Prabhakaran et al. |

*Primary Examiner* — Hashem Farrokh
(74) *Attorney, Agent, or Firm* — Hollingsworth Davis, LLC

(57) ABSTRACT

A data structure is formed that references a garbage collection metric for each of a plurality of associated garbage collection units of a flash memory device. Each garbage collection metric is based on one or more device state characteristics of the associated garbage collection unit. In response to a threshold change in the one or more device state variables, a region of interest within the data structure is sorted based on the garbage collection metrics. One or more garbage collection units are selected for garbage collection operations from the sorted region of interest.

20 Claims, 6 Drawing Sheets

SELECTION OF UNITS FOR GARBAGE COLLECTION IN FLASH MEMORY

SUMMARY

Various embodiments of the present invention are generally directed to methods, systems, and apparatuses that facilitate selection of units for garbage collection. In one embodiment, a method, apparatus, system, and/or computer readable medium may facilitate forming a data structure that references a garbage collection metric for each of a plurality of associated garbage collection units of a flash memory device. Each garbage collection metric is based on one or more device state characteristics of the associated garbage collection unit. In response to a threshold change in the one or more device state variables, a region of interest within the data structure is sorted based on the garbage collection metrics. One or more garbage collection units are selected for garbage collection operations from the sorted region of interest.

In one particular configuration, the garbage collection units with a high range of garbage collection metric values are selected first for the garbage collection operations, and the region of interest in such a case includes the garbage collection units having the high range of the garbage collection metric values. In such a case, if the region of interest does not include any garbage collection metrics, another portion of the data structure may be defined as the region of interest and sorting is performed within the other portion.

In another particular configuration, the data structure may include a plurality of segments each comprising one or more elements that make reference to the garbage collection metrics. In such a case, the boundaries of the segments may be determined based on the garbage collection metrics of the elements within the segments, and the region of interest may encompass at least one of the plurality of segments. Also in such a case, a new element may be determined that is to be added to the data structure, and if a garbage collection metric associated with the new element causes the new element to be added to the region of interest, at least the new element is inserted in a sorted order into the region of interest. If the garbage collection metric associated with the new element does not cause the new element to be added to the region of interest in such a case, the new element may be added into one of the others of the segments based on the boundaries of the respective other segments without performing sorting operations. In this particular configuration, the boundaries of the segments may be modified based on a change of a distribution of the garbage collection metrics within the data structure.

In another embodiment, a method, apparatus, system, and/or computer readable medium may perform and/or facilitate maintaining a collection of elements that each include a garbage collection metric of a respective one of a plurality of garbage collection units. The garbage collection metrics are based on one or more device state variables. A data structure is formed that includes a plurality of second elements that are each associated with one of the elements of the collection. The garbage collection units are selected for a garbage collection operation based on an order of the second elements within the data structure. In response to determining a threshold change in the device state variables, only a region of interest within the data structure is sorted based on the garbage collection metrics of the second elements in the region of interest.

In one particular configuration, an event is determined that triggers the garbage collection operation for at least one of the garbage collection units. If the region of interest does not include any of the second elements, another portion of the data structure is defined as the region of interest and the second elements are sorted within the other portion. A selected element may be removed from the region of interest, and the garbage collection operation performed on a garbage collection unit associated with the selected element.

In another particular configuration, the number of second elements may be smaller than the number of the elements of the collection. In such a case, one or more of the elements of the collection are not represented in the data structure.

In yet another more particular configuration, the data structure includes a plurality of segments each having one or more of the second elements. In such a case, the boundaries of the segments may be determined based on the garbage collection metrics of the second elements within the segments, and the region of interest encompasses at least one of the plurality of segments. In this configuration, a new second element that is to be added to the data structure may also be determined from the collection of elements. In such a case, if a garbage collection metric associated with the new second element causes the new second element to be added to the region of interest, at least the new second element is inserted in a sorted order into the region of interest. Otherwise the new second element may be added into one of the others of the segments based on the boundaries of the respective other segments without performing any sorting operations. In yet another alternative of this particular configuration, the boundaries of the segments may be modified based on a change of a distribution of the garbage collection metrics within the data structure.

These and other features and aspects of various embodiments of the present invention can be understood in view of the following detailed discussion and the accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1A:
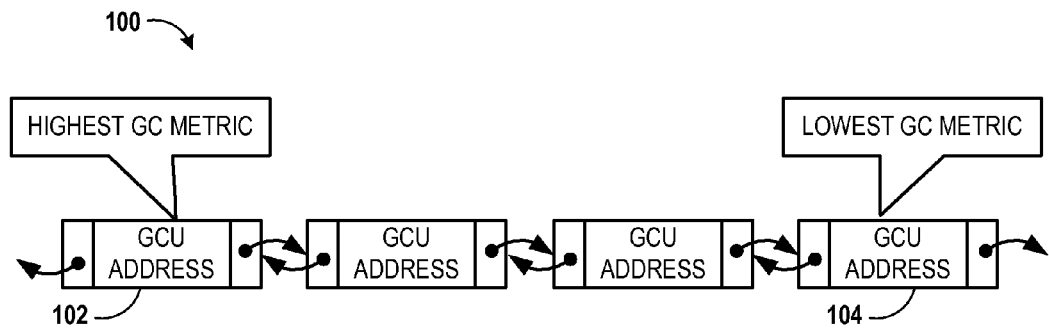
FIG. 1A is a block diagram of a data structure used for maintaining garbage collection metrics according to an example embodiment of the invention.

The present disclosure relates to garbage collection selection policy in an electronic data storage system. Generally, a system, apparatus and/or method according to embodiments of the invention may be able to more efficiently store/maintain garbage collection metrics using a data structure such as a linked list. Particular embodiments may also include features for effectively and efficiently selecting an optimal candidate for garbage collection based on the garbage collection metrics.

The garbage collection features discussed herein may be utilized in storage systems such as flash memory devices. Flash memory is an example of a solid-state storage media. Flash memory, e.g., NAND or NOR flash memory, generally includes cells similar to a metal-oxide semiconductor (MOS) field-effect transistor (FET), e.g., having a gate (control gate), a drain, and a source. In addition to these features, the flash memory cell includes a "floating gate." When a voltage is applied between the gate and the source, the voltage difference between the gate and the source creates an electric field, thereby allowing electrons to flow between the drain and the source in the conductive channel created by the electric field. When strong enough, the electric field may force electrons flowing in the channel onto the floating gate.

The number of electrons on the floating gate determines a threshold voltage level of the cell. When a selected voltage is applied to the floating gate, the differing values of current may flow through the gate depending on the value of the threshold voltage. This current flow can be used to characterize two or more states of the cell that represent data stored in the cell. This threshold voltage does not change upon removal of power to the cell, thereby facilitating persistent storage of the data in the cell. The threshold voltage of the floating gate can be changed by applying an elevated voltage to the control gate, thereby changing data stored in the cell. A relatively high reverse voltage can be applied to the control gate to return the cell to an initial, "erased" state.

Flash memory may be used in devices such as solid state drives (SSDs) that can be used in place of a hard drive. An SSD may appear to the end user as appearing and operating similar to a hard drive, although the SSD often accesses data much faster than a traditional hard drive. Even with these similarities, because the data storage media used by hard drives and SSDs are different, there may be a number of differences in how the controller logic of the respective devices operate.

For example, one difference between hard drives and flash memory is the way in which data is rewritten. In a magnetic media such as a disk drive, each unit of data (e.g., byte, word) may be arbitrarily overwritten by changing a magnetic polarity of a write head as it passes over the media. In contrast, flash memory cells must first be erased by applying a relatively high voltage to the cells before being written, or "programmed."

For a number of reasons, these erasures are often performed on blocks of data (also referred to herein as "erase units" or "erasure blocks"). An erase unit may include any physical or logical blocks of memory that are treated as a single unit for purposes of erasure. In many implementations, erase units are contiguous physical units that are larger than the data storage units (e.g., pages) that may be individually read or programmed. In such a case, when data of an existing page needs to be changed, it may be inefficient to erase and rewrite the entire block in which the page resides, because other data within the block may not have changed. Instead, it may be more efficient to write the changes to empty pages in a new physical location, remap the logical to physical mapping for the altered blocks via the controller logic, and mark the old physical locations as invalid/stale.

After some time, numerous data storage units within a block may be marked as stale due to changes in data stored within the block. As a result, it may make sense to move any valid data out of the block to a new location, erase the block, and thereby make the block freshly available for programming. This process of tracking invalid/stale data units, moving of valid data units from an old block to a new block, and erasing the old block is sometimes collectively referred to as "garbage collection." Garbage collection may be triggered by any number of events. For example, metrics (e.g., a count of stale units within a block) may be examined at regular intervals and garbage collection may be performed for any blocks for which the metrics exceed some threshold. Garbage collection may also be triggered in response to other events, such as read/writes, host requests, current inactivity state, device power up/down, explicit user request, device initialization/re-initialization, etc.

Garbage collection is performed on garbage collection units (GCUs), which generally refer to physical units that are garbage collected and erased as a contiguous unit. In some flash memory implementations, the smallest size of a GCU is one erasure block. It may be possible in some implementations for a garbage collection unit to include multiple erasure blocks, and other variations between GCU size and erase unit size are also possible. For the purposes of the following discussion, the GCU may be of a predetermined size, but need not have any direct correspondence to the size of erasure units upon which garbage collection is performed.

As described above, in some storage systems such as flash based SSDs, there is an erase before each program of a GCU. This erase process must first ensure that any valid data currently residing in that GCU is moved to another location, or held in the buffer until this GCU is ready for programming. This process of moving the valid data and erasing the GCU may be part of a garbage collection operation. In order to find the optimal candidate for garbage collection, garbage collection (GC) metrics are maintained for the GCUs. One often-used garbage collection metric is a staleness count, which reflects the number of stale logical block addresses (LBAs) residing in a particular GCU. As will be described further below, other characteristics may also be considered when forming a garbage collection metric.

In order to select candidate GCUs for garbage collection, a search operation may be performed to find GCUs whose metrics satisfy some threshold value. However, because a storage device's controller logic may have limited processing capabilities, performing such a search operation may costly in both time and resources. Accordingly, a proposed operation discussed below is intended to facilitate an efficient storage and update mechanism for the garbage collection metrics, and provide a quick and efficient search method to find the optimal GCU for garbage collection.

In reference now to FIG. 1A, a block diagram illustrates a data structure for maintaining GCU metrics according to an example embodiment of the invention. In this figure, the GC metrics may be stored in a sorted linked-list 100. As is known in the art, a linked list is a data structure for storing a collection of data elements. Each element within a list has at least one reference (e.g., pointer) to another element of the list. If each element has only one pointer to another element (typically the "next" element in the list) this is referred to as a singly-linked list. If each element has two pointers, e.g., to the previous and next list element, this is known as a doubly-linked list. While the list 100 in FIG. 1A, as well as other lists shown in subsequent figures, may be illustrated and/or described as doubly-linked lists, the invention need not be so limited. The invention may be applicable to any data structures and/or collection that are able to perform equivalent functions to the illustrated lists, including trees, hash sets, and other linked-type data structures.

Besides storing pointers to other elements, the elements of the list 100 include data, which in this case may each include at least an address of a target GCU and a metric associated with the GCU. The list 100 may be ordered/sorted based at least on the GC metric, as represented by element 102 with the highest GC metric value and element 104 having the lowest GC metric value. In this example, GCUs associated with elements having higher metric values will be selected first for garbage collection. In such a case, the GCU address pointed to by element 102 would be next chosen for garbage collection.

After garbage collection occurs, the element corresponding to the newly erased GCU may be inserted at the other end of the list, as indicated by list element 104. As will be described in greater detail hereinbelow, elements corresponding to recently collected GCUs need not be immediately returned to the list 100. For example, these GCUs may be part of a pool or array of data elements, only a subset of which are referenced in the list 100 at any given time.

The list 100 may be updated upon host write, garbage collection, and any other operations that effect GC metrics, such as number of reads, time, disturbance, etc. To limit the impact on computational resources, sorting of elements within the list 100 may only be done at certain thresholds of interest. In some configurations, a pointer to the next GCU may be maintained (e.g., by a garbage collection controller) to select which will be the next GCU selected for garbage collection. As is shown in FIG. 1A, this pointer may be the entry 102 with the highest GC metrics, which requires no searching, since the list is already sorted. During times of wear leveling, the pointer may be moved from the head of the list to a point further down the list. The will force the usage of GCU that have not been re-written frequently to be forced into the active data pool.

The garbage collection metrics used to order the list 100 may be based on a multi-factor formulation such as shown in equation (1) below. Equation (1) considers a number of device state variables that may be used to calculate a current garbage collection metric $GC_n$, such as staleness ($Stale^{n1}$), time since last written ($Time^{n2}$), media temperature ($Temp^{n3}$), read disturb ($Disturb^{n4}$), and wear ($Wear^{n5}$), and may be adapted to consider other factors, such as soft read metrics. This equation includes a weighting factor based on previous metric values ($GC_{n-1}$). The other state variables have scaling factors $k_1$-$k_5$, $n_1$-$n_5$ that can change over time. It will be appreciated that due to these and other constraints, there may different dominating factors at different points in time that affect change in the current metric $GC_n$.

$$GC_n = m(k_1 Stale^{n1} + k_2 Time^{n2} + k_3 Temp^{n3} + k_4 Disturb^{n4} + k_5 Wear^{n5}) + (1-m)GC_{n-1} \quad (1)$$

In order to initially populate the list 100, each of a plurality of GCUs is examined and a list element created for each respective GCU. If the list 100 was empty, an element associated with the first selected GCU may be used to form the entire list. Otherwise, the metric associated with the selected GCU may be compared with the metric of an element at one end of the list, such as element 104. In such a case, if the metric of the selected GCU is lower than that of 104 element, the element of the selected GCU would form the new end of the list 100. Otherwise, the list 100 would be traversed until an element with a higher metric is found, and the newly added element may be inserted just before the element with the higher metric. Such a procedure could also take place at the other end of the list (e.g., starting with element 102), utilizing a different comparison (e.g., looking for a lower metric than that of the current GCU). In this way, list elements may be sorted as they are added to the list, at least based on their current GC metric.

While list 100 may be automatically sorted as items are inserted, the desired ordering within the list may change over time due to the time varying nature of the collective metrics calculated using equation (1). As a result, the list 100 may occasionally need to be resorted to ensure optimal selection over time of GCUs for garbage collection. In typical linked-list sort operations, the entire list is sorted from head to tail. A full sort operation can be complex, and as a result can be both time consuming and resource intensive. As a result, in some embodiments described herein, only a portion of the list needs to be sorted in order to obtain adequate garbage collection results. For example, a linked list may be broken up into portions, and references to those portions can be saved/referenced for future access. One or more of those portions can be designated as a region of interest, and only the region of interest is sorted based on certain system events.

Figure 1B:
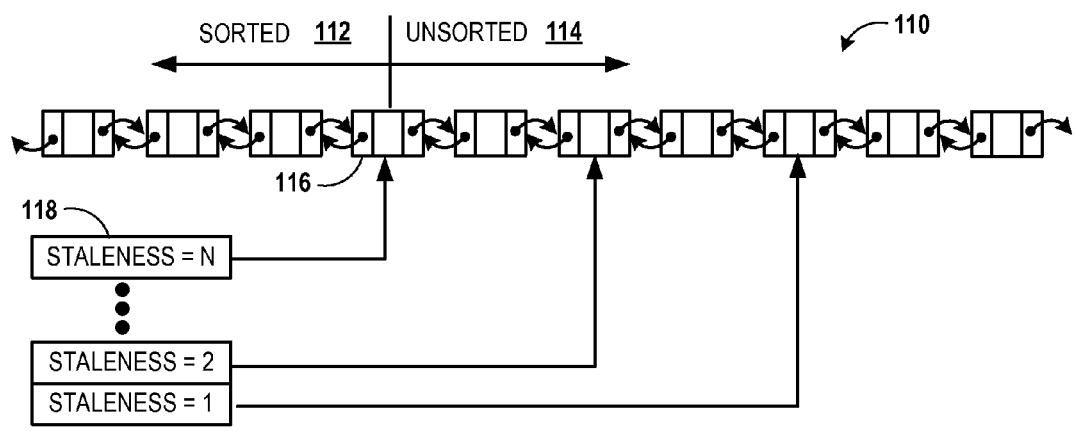
FIG. 1B is a block diagram of a partially sorted linked-list for maintaining garbage collection metrics according to an example embodiment of the invention.

An example of a partially sorted list according to an embodiment of the invention is shown in the block diagram of FIG. 1B. A linked list 110 may include elements similar to those in list 100 of FIG. 1A, and elements may be inserted/added to the list in a similar manner as described in regards to list 100. Under some conditions, the elements of the list 110 may need to be resorted. For example, a resorting event may be triggered when a garbage collection metric is incremented above a certain threshold. In this example, when such an event triggers resorting of the list 112, only a portion 112 of the list need be sorted, while another portion 114 is not sorted.

In this example, portions 112 and 114 are delineated by a particular element 116. This "border" element 116 could be part of either sorted or non-sorted portions 112, 114, and more than one element may be part of a group that defines a border between the portions 112, 114. As with list 100, the portion 112 at the left end (top) of list 110 may be associated with higher garbage collection metrics. As a result, portion 112 is chosen for resorting because it is from the end of the list 110 that will be used to select the next GCUs for garbage collection.

Embodiments of the invention may use a number of different criteria for defining element 116 that serves to delineate the portions 112, 114. In this example, a particular threshold value 118 is used to define a boundary of the region of interest to which sorting/resorting is perform. In the figure, the value 118 is indicated as a particular value of staleness, although the value 118 could be the full metric as calculated in equation (1), and/or some combination of other values. The element 116 may be defined using other criteria, such as being located at some location within the list, e.g., the region of interest 112 may include top N % of list elements, etc.

Figure 2:
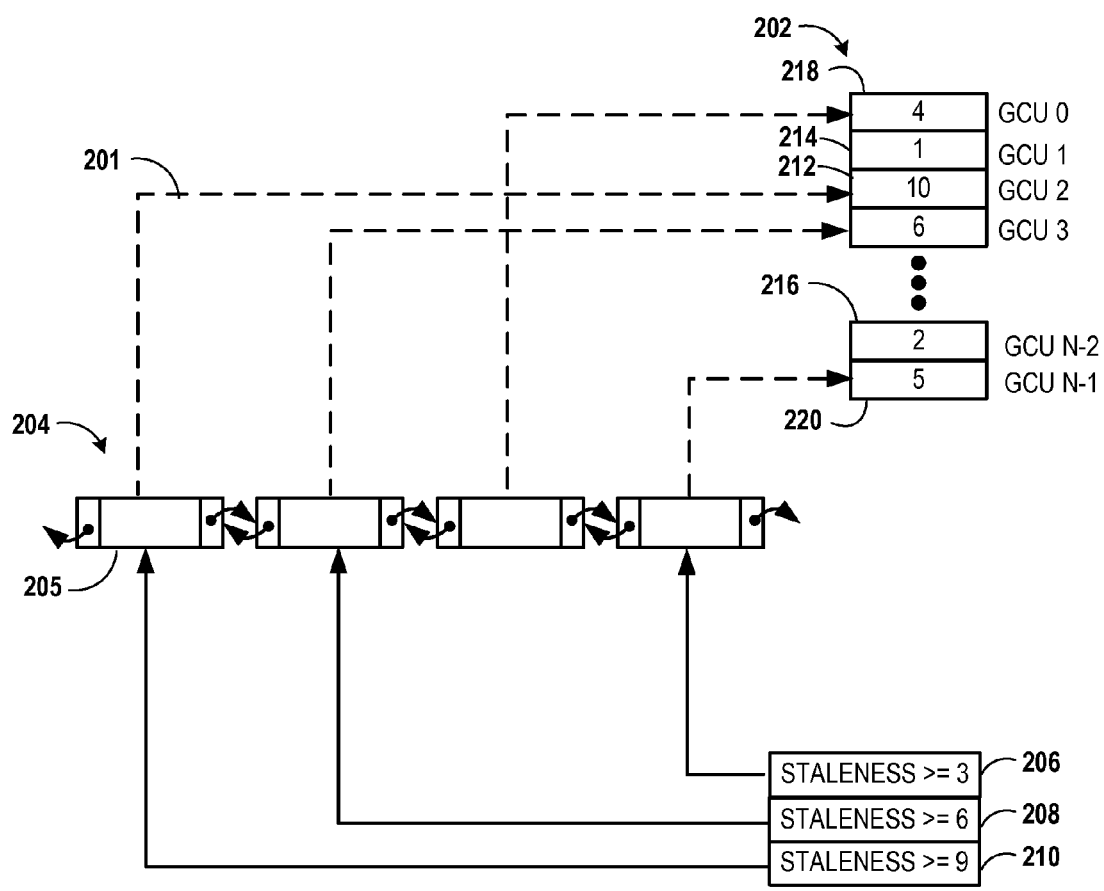
FIG. 2 is a block diagrams illustrating a linked list that references elements of an array according to an example embodiment of the invention.

In the embodiment shown in FIG. 1B, elements below certain thresholds (e.g., in portion 114) are un-sorted, and so may not need to be stored in the list in some cases. This type of variation according to an embodiment of the invention is shown in the block diagram of FIG. 2. In this example, an array 202 is used to store a primary collection/pool of GC metrics. Generally, an array may be more memory efficient than a list or similar structure, and facilitates fast random access to its member elements. The invention need not be limited to an array to store this data; any equivalent data structure known in the art may be utilized to pool the data shown in array 202.

The array 202 may include references to all available GCUs on a memory device. In addition, one or more linked lists 204 may be maintained for purposes such as sorting and selecting GCUs for garbage collection. The elements of the linked list 204 need only carry a tag/pointer to the data structures maintained in the array 202, thus minimizing the storage requirements for the list 204. This is indicated by way of the dashed lines, e.g., element 205 of the list 204 is linked with element 212 of the array 202 via dashed line 201.

As shown by indicators 206, 208, 210, the list 204 may be divided into different segments, similar to what was previously described in relation to the list 110 in FIG. 1B. Here the indicators 206, 208, 210 indicate delimiters between multiple segments of the list 204, and these locations 206, 208, 210 may be externally referenced (e.g., via a garbage collection controller) for quick access to the elements within the respective segments. Elements of the list 204 are assigned in order based on the GC metrics of the associated array element, the GC metrics being indicated in FIG. 2 by the numerals within each element of array 202. For example, array element 212 is associated with a GCU metric of value 10, and therefore list element 205 that references array element 212 is located in segment 210 which is designated for metrics greater than or equal to 9.

Generally, if conditions warrant recalculating GCU metrics, the calculations may be performed/estimated for at least some elements of the array 202. The conditions for determining whether metrics should be recalculated may include determining whether a threshold for change in state values would have a small or large effect on the recalculated metric. This may be determined, for example, by looking at a first derivative of equation (1) to determine how sensitive the current metric value is to a particular state variable that has recently changed.

If a change in metric causes an array value crosses one of the segment boundaries 206, 208, 210, the element could be added to the appropriate list segment and sorted. Only the tag of the GC metric may be needed in this case and not the actual GC metric value, thereby reducing the size of the storage structure. List 204 may be assembled in a "sorted" order based on metrics of elements at the time they are inserted to the list 204. Only a portion of the list 204 (e.g., top portion(s) with highest GC metric) need to be sorted if and when the metrics change. If elements are inserted into a segment of list 204 that is not of interest at this time (e.g., does not need to be resorted), the elements may simply be appended to a segment boundary, or may be inserted at a quasi-sorted location by traversing the elements within the segment based on current GC metrics.

Note that not all elements from the primary array 202 need be in the sorted list 204. For example, elements 214 and 216 are not shown in the list 204, e.g., due to metric values that fall below a particular threshold. Also note that in this state, element 220 actually has a higher GC metric than element 218, but they are not in that order in the sorted list 204. This is because, at that segment of the list, ordering of elements may not matter and so sorting that part of the list 204 may be wasteful.

There may be a practical limit number of how many segments of the list 204 can or should be tracked, although the invention limited to any particular number of segments. Initially all the segments boundaries could be defined by set values of GC metrics (e.g., 1, 2, 3, 4, etc.). As the distribution of GC metrics grows/changes, the segment boundaries (e.g., 206, 208, 210) could move to create an equal number of entries in each group, and/or to create a lower burden on the sorted higher portion. In another variation, the distribution of the segment boundaries may be non-linear, e.g., using a logarithmic type scale.

Figure 3A:
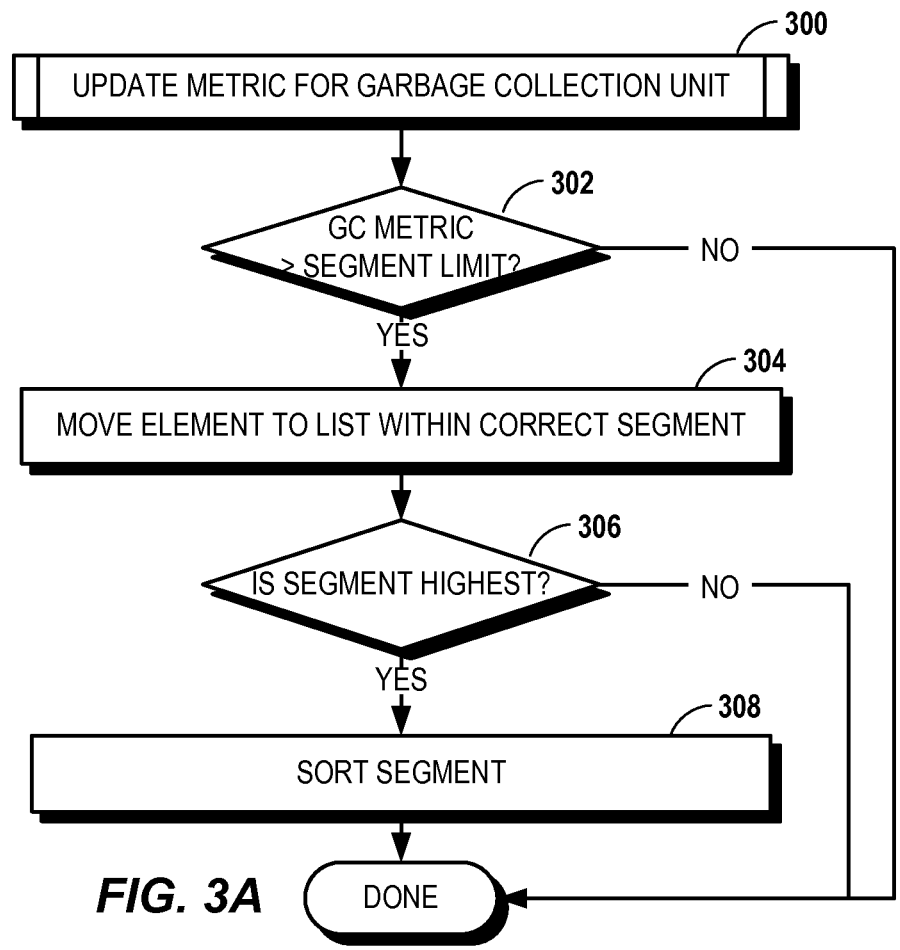
FIGS. 3A-B are flowcharts illustrating garbage collection procedures according to example embodiments of the invention.

In reference now to FIG. 3A, a flowchart illustrates a procedure 300 for updating GCU metrics according to an example embodiment of the invention. When a GC metric is updated, a list of segments are checked 302 to see if GC metric of the GCU being currently examined is within one of the segment ranges (this may only require checking the lowest value of each segment). If the GC metric is within a segment range, the GC metric will be added 304 to that segment. As an element hits the highest segment, as determined at 306, then a sorting operation 308 may occur on that segment, but not until then. The sorting operation 308 may involve a full resort of the entire segment, or may just involve traversing the segment to insert the element into a correct order, e.g., inserted before the first element that has the same or higher metric value.

Figure 3B:
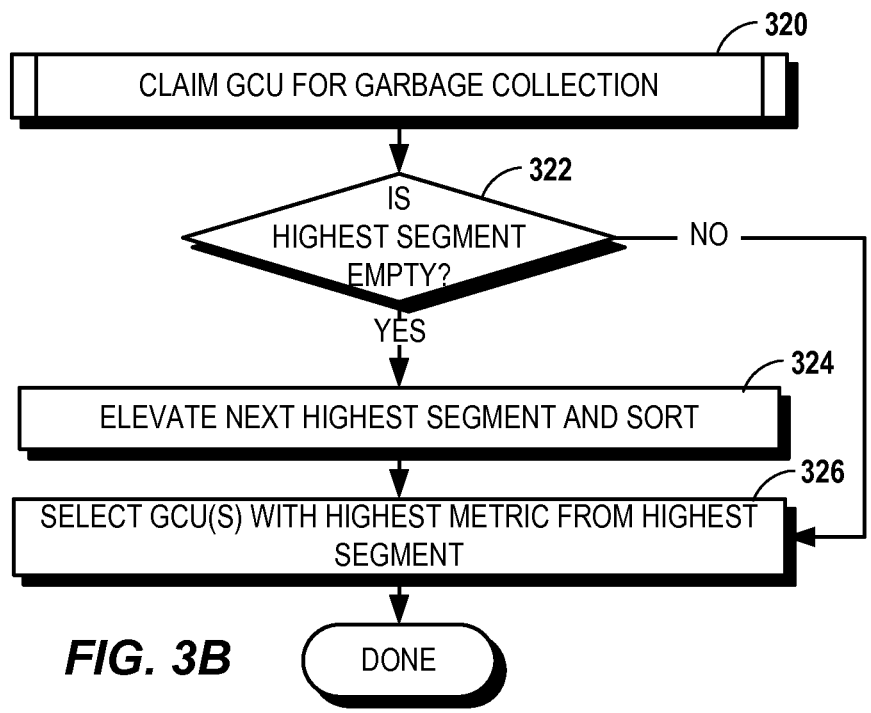

In reference now to FIG. 3B, a flowchart illustrates a procedure 320 to claim a GCU for garbage collection according to an example embodiment of the invention. The GCU may be claimed for any number of reasons, including a regular scan of GCU metrics and/or a specific event (e.g., user/host request) that triggers garbage collection. A check 322 is made to see whether the highest segment of a list (e.g., a segment that may be a region of interest because of having the highest GC metrics) becomes empty. If so, the next highest segment will be elevated 324 to the region of interest and the segment is sorted. Then the GCU with the highest metric (which will be at the front of the sorted list segment) is selected 326 for garbage collection. This helps ensure obtaining the optimal GC metric, while minimizing sorting operations.

Figure 4:
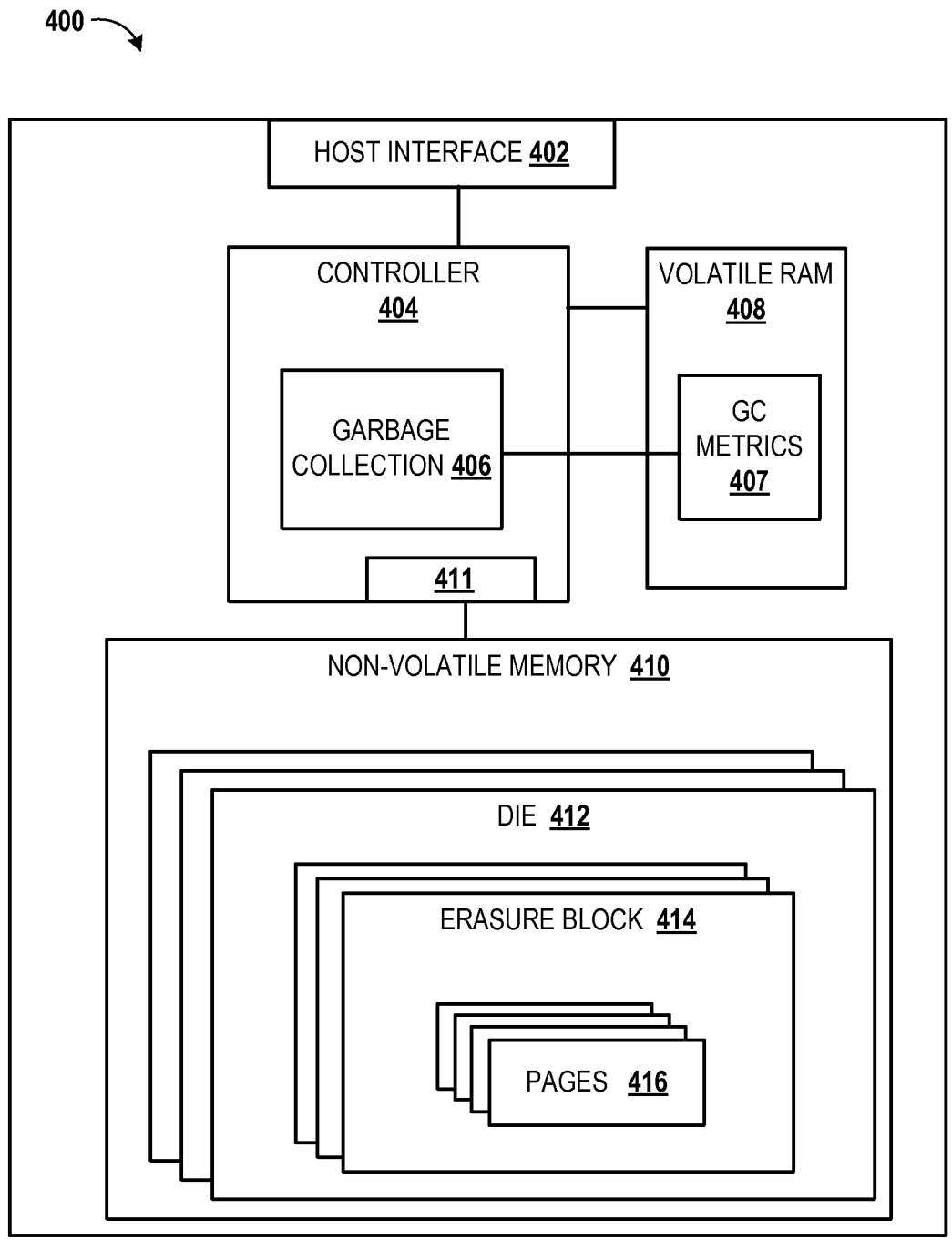
FIG. 4 is a block diagram illustrating an apparatus according to an example embodiment of the invention.

In reference now to FIG. 4, a block diagram illustrates an apparatus 400 which may incorporate features of the present invention described herein. The apparatus 400 may include any manner of persistent storage device, including a solid-state drive (SSD), thumb drive, memory card, embedded device storage, etc. A host interface 402 may facilitate communications between the apparatus 400 and other devices, e.g., a computer. For example, the apparatus 400 may be configured as an SSD, in which case the interface 402 may be compatible with standard hard drive data interfaces, such as Serial Advanced Technology Attachment (SATA), Small Computer System Interface (SCSI), Integrated Device Electronics (IDE), etc.

The apparatus 400 includes one or more controllers 404, which may include general- or special-purpose processors that perform operations of the apparatus. The controller 404 may include any combination of microprocessors, digital signal processor (DSPs), application specific integrated circuits (ASICs), field programmable gate arrays (FPGAs), or other equivalent integrated or discrete logic circuitry suitable for performing the various functions described herein. Among the functions provided by the controller 404 are that of garbage collection, which is represented here by functional module 406. The module 406 may be implemented using any combination of hardware, software, and firmware. The controller 404 may use volatile random-access memory (RAM) 408 during operations. The RAM 408 may be used, among other things, to cache data read from or written to non-volatile memory 410, map logical to physical addresses, and store other operational data used by the controller 404 and other components of the apparatus 400.

The non-volatile memory 410 includes the circuitry used to persistently store both user data and other data managed internally by apparatus 400. The non-volatile memory 410 may include one or more flash dies 412, which individually contain a portion of the total storage capacity of the apparatus 400. The dies 412 may be stacked to lower costs. For example, two 8-gigabit dies may be stacked to form a 16-gigabit die at a lower cost than using a single, monolithic 16-gigabit die. In such a case, the resulting 16-gigabit die, whether stacked or monolithic, may be used alone to form a 2-gigabyte (GB) drive, or assembled with multiple others in the memory 410 to form higher capacity drives.

The memory contained within individual dies 412 may be further partitioned into blocks, here annotated as erasure blocks/units 414. The erasure blocks 414 represent the smallest individually erasable portions of memory 410. The erasure blocks 414 in turn include a number of pages 416 that represent the smallest portion of data that can be individually programmed or read. In a NAND configuration, for example, the page sizes may range from 512 bytes to 4 kilobytes (KB), and the erasure block sizes may range from 16 KB to 512 KB. It will be appreciated that the present invention is independent of any particular size of the pages 416 and blocks 414, and the concepts described herein may be equally applicable to smaller or larger data unit sizes.

It will be appreciated that an end user of the apparatus 400 (e.g., host computer) may deal with data structures that are smaller than the size of individual pages 416. Accordingly, the controller 404 may buffer data in the volatile RAM 408 until enough data is available to program one or more pages 416. The controller 404 may also maintain mappings of logical block address (LBAs) to physical addresses in the volatile RAM 408, as these mappings may, in some cases, may be subject to frequent changes based on a current level of write activity.

The garbage collection module 406 may include operational logic to perform the garbage collection procedures described herein. The module 406 may maintain various data structures described herein (e.g., linked list, arrays) for tracking and utilizing GC metrics 407 that may be stored in RAM 408 and/or non-volatile memory 410. The module 406 may examine system state variables that affect garbage collection metrics, apply those metrics to GCUs within the non-volatile memory 410, and store the GC metrics data 407 that defines those relationships. The GC metrics data 407 for the entire device 400 may be stored in a pool, and subset selected to be referenced by an ordered list. The list may be at least partially sorted so that GCUs with the highest metrics are at the top.

When a system event indicates the need to perform garbage collection, one or more elements are taken from the top of the list. A GCU associated with the removed element may have a garbage collection operation performed on it. This operation may include, among other things, moving valid data from the GCU to an available block of the memory 410, erasing the cells of the GCU, and making the GCU ready for programming. This operation may also affect the GC metric, and so the metric may be recalculated. Based on the recalculated metric, the removed element may be put back into the list and/or placed in a pool.

Figure 5:
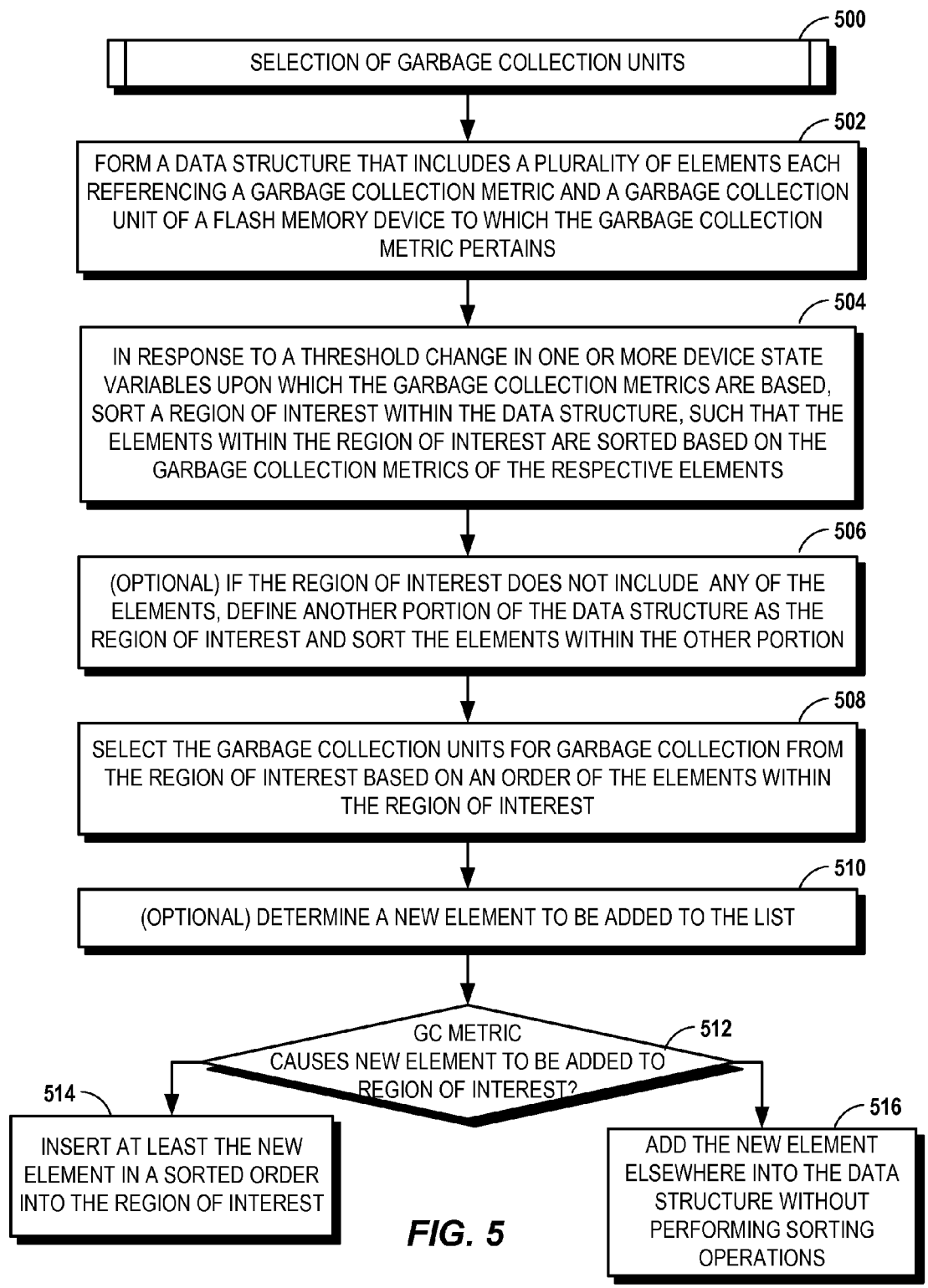
FIG. 5 is a flowchart illustrating a garbage collection procedure according to an example embodiment of the invention.

In reference now to FIG. 5, a flowchart 500 illustrates a procedure according to an example embodiment of the invention. The procedure 500 involves forming 502 a data structure (e.g., linked list or other linked-type structure) having a plurality of elements each referencing a) a garbage collection metric and b) one of a plurality of garbage collection units of a flash memory device to which the garbage collection metric pertains. In response to a threshold change in one or more device state variables upon which the garbage collection metrics are based, only a region of interest within the structure is sorted 504, wherein the list elements within the region of interest are sorted based on the garbage collection metrics of the respective list elements.

The procedure 500 may optionally include determining if the region of interest does not include any of the elements (e.g., is empty), and if so, defining 506 another portion of the data structure as the region of interest and sorting the elements within the other portion. The garbage collection units may be selected 508 for garbage collection operations from the region of interest based on an order of the elements within the region of interest. Optionally, it may be determined 510 that a new element is to be added to the list. In such a case, if it is determined 512 that a garbage collection metric associated with the new element causes the new element to be added to the region of interest, at least the new element is inserted 514 in a sorted order into the region of interest. Otherwise, the new element is added 516 into one of the others of the segments based on the boundaries of the respective other segments without performing sorting operations.

Figure 6:
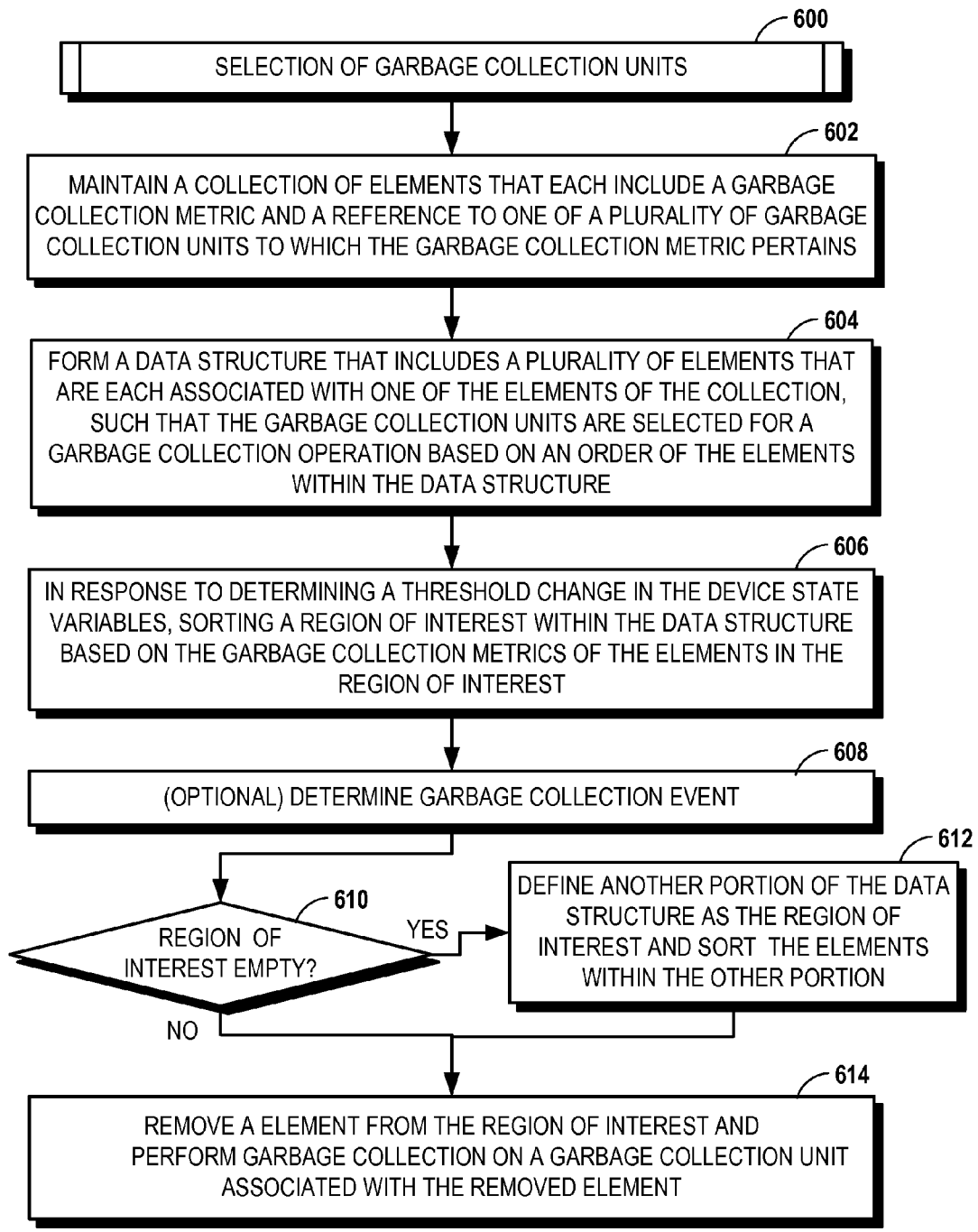
FIG. 6 is a flowchart illustrating another garbage collection procedure according to another example embodiment of the invention.

In reference now to FIG. 6, a flowchart 600 illustrates another procedure according to an example embodiment of the invention. The procedure 600 involves maintaining 602 a collection of elements that may each include: a) a garbage collection metric; and b) a reference to one of a plurality of garbage collection units to which the garbage collection metric pertains. The garbage collection metrics are based on one or more device state variables. A data structure is formed 604, the structure including a plurality of elements that are each associated with one of the elements of the collection, such that the garbage collection units are selected for a garbage collection operation based on an order of the elements within the data structure.

In response to determining a threshold change in the device state variables, only a region of interest is sorted 606 within the data structure based on the garbage collection metrics of the elements in the region of interest. The procedure 600 may optionally involve determining 608 a garbage collection event, and in response, determining 610 whether the region of interest is empty. If so, another portion of the data structure is defined 612 as the region of interest and the elements within the other portion are sorted. In either outcome of 610, a element is eventually removed 614 from the region of interest and a garbage collection operation is performed on a garbage collection unit associated with the removed element.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
    forming a data structure referencing a garbage collection metric for each of a plurality of associated garbage collection units of a flash memory device, each garbage collection metric based on one or more device state variables of the associated garbage collection unit;
    in response to a threshold change in the one or more device state variables, sorting a region of interest within the data structure based on the garbage collection metrics; and
    selecting one or more garbage collection units for garbage collection operations from the sorted region of interest.

2. The method of claim 1, wherein the garbage collection units with a high range of garbage collection metric values are selected first for the garbage collection operations, and wherein the region of interest comprises the garbage collection units having the high range of the garbage collection metric values.

3. The method of claim 2, wherein, if the region of interest does not comprise any garbage collection metrics, defining an other portion of the data structure as the region of interest and sorting within the other portion.

4. The method of claim 1, wherein the data structure comprises a plurality of segments each comprising one or more elements that make reference to the garbage collection metrics, wherein boundaries of the segments are determined based on the garbage collection metrics of the elements within the segments, and wherein the region of interest encompasses at least one of the plurality of segments.

5. The method of claim 4, further comprising:
   determining a new element that is to be added to the data structure; and
   if a garbage collection metric associated with the new element causes the new element to be added to the region of interest, inserting at least the new element in a sorted order into the region of interest.

6. The method of claim 5, further comprising, if the garbage collection metric associated with the new element does not cause the new element to be added to the region of interest, adding the new element into an other of the segments based on the boundaries of the other segment without performing sorting operations.

7. The method of claim 4, further comprising modifying the boundaries of the segments based on a change of a distribution of the garbage collection metrics within the data structure.

8. An apparatus, comprising:
   a plurality of garbage collection units each comprising a plurality of flash memory units;
   a controller configured to perform a garbage collection operation on the garbage collection units, the controller causing the apparatus to:
      form a data structure referencing a garbage collection metric for each of a plurality of associated garbage collection units of a flash memory device, wherein each garbage collection metric is based, wherein each on one or more device state variables of the associated garbage collection unit;
      in response to a threshold change in the one or more device state variables, sort a region of interest within the data structure based on the garbage collection metrics; and
      select one or more garbage collection units for garbage collection operations from the sorted region of interest.

9. The apparatus of claim 8, wherein the garbage collection units with a high range of garbage collection metric values are selected first for the garbage collection operations, and wherein the region of interest comprises the garbage collection units having the high range of the garbage collection metric values.

10. The apparatus of claim 9, wherein the controller further causes the apparatus to, if the region of interest does not comprise any garbage collection metrics, define an other portion of the data structure as the region of interest and sorting within the other portion.

11. The apparatus of claim 8, wherein the data structure comprises a plurality of segments each comprising one or more of elements that make reference to the garbage collection metrics, wherein boundaries of the segments are determined based on the garbage collection metrics of the elements within the segments, and wherein the region of interest encompasses at least one of the plurality of segments.

12. The apparatus of claim 11, wherein the controller further causes the apparatus to:
   determine a new element that is to be added to the data structure; and
   if a garbage collection metric associated with the new element causes the new element to be added to the region of interest, insert at least the new element in a sorted order into the region of interest, otherwise add the new element into an other of the segments based on the boundaries of the other segment without performing sorting operations.

13. The apparatus of claim 11, wherein the controller further causes the apparatus to modify the boundaries of the segments based on a change of a distribution of the garbage collection metrics within the data structure.

14. A method comprising:
   maintaining a collection of elements that each comprise a garbage collection metric of a respective one of a plurality of garbage collection units, wherein the garbage collection metrics are based on one or more device state variables;
   forming a data structure comprising a plurality of second elements that are each associated with one of the elements of the collection, wherein the garbage collection units are selected for a garbage collection operation based on an order of the second elements within the data structure; and
   in response to determining a threshold change in the device state variables, sorting only a region of interest within the data structure based on the garbage collection metrics of the second elements in the region of interest.

15. The method of claim 14, further comprising:
   determining an event that triggers the garbage collection operation for at least one of the garbage collection units;
   if the region of interest does not include any of the second elements, defining an other portion of the data structure as the region of interest and sorting the second elements within the other portion;
   removing a selected second element from the region of interest; and
   performing the garbage collection operation on a garbage collection unit associated with the selected second element.

16. The method of claim 14, wherein the number of second elements is smaller than the number of the elements of the collection such that one or more of the elements of the collection are not represented in the data structure.

17. The method of claim 14, wherein the data structure comprises a plurality of segments each comprising one or more of the second elements, wherein boundaries of the segments are determined based on the garbage collection metrics of the second elements within the segments, and wherein the region of interest encompasses at least one of the plurality of segments.

18. The method of claim 17, further comprising:
   determining, from the collection of elements, a new second element that is to be added to the data structure; and
   if a garbage collection metric associated with the new second element causes the new second element to be added to the region of interest, inserting at least the new second element in a sorted order into the region of interest, otherwise adding the new second element into an other of the segments based on the boundaries of the other segment without performing any sorting operations.

19. The method of claim 17, further comprising modifying the boundaries of the segments based on a change of a distribution of the garbage collection metrics within the data structure.

20. An apparatus comprising a plurality of flash memory units and a controller configured to cause the apparatus to perform the method of claim 14, wherein the plurality of garbage collection units each comprise a portion of the plurality of flash memory units.

* * * * *